UNITED STATES PATENT OFFICE.

BENJAMIN T. BROOKS, OF PITTSBURGH, PENNSYLVANIA, ASSIGNOR, BY MESNE ASSIGNMENTS, TO E. I. DU PONT DE NEMOURS & COMPANY, OF WILMINGTON, DELAWARE, A CORPORATION OF DELAWARE.

MANUFACTURE OF TOLUENE.

1,324,143.   Specification of Letters Patent.   Patented Dec. 9, 1919.

No Drawing.   Application filed June 10, 1915. Serial No. 33,263.

*To all whom it may concern:*

Be it known that I, BENJAMIN T. BROOKS, a citizen of the United States, residing at Pittsburgh, in the county of Allegheny and State of Pennsylvania, have invented certain new and useful Improvements in the Manufacture of Toluene, of which the following is a specification.

This invention relates to the manufacture of toluene; and it comprises a method wherein crude solvent naphtha from coal tar and other like materials high in xylenes are heated with aluminum chlorid or other like equilibrium-producing catalyst to convert such xylenes into toluene, produced toluene being removed from the sphere of action substantially as fast as it forms; all as more fully hereinafter set forth and as claimed.

The various neutral hydrocarbon oils are present in coal tar in approximately constant proportions while the commercial demand for benzol or benzene and toluol or toluene is much greater than that for the higher-boiling heavy oils, the xylenes, etc. Chemically, these oils are nearly related; toluene being benzene ($C_6H_6$) in which one atom of H is replaced by the methyl group, $CH_3$. Toluene is therefore $C_6H_5.CH_3$, "methyl-benzene." The xylenes are dimethyl benzenes, having two hydrogen atoms replaced by two methyl groups, $C_6H_4(CH_3)_2$. There are three of these xylenes known, differing from each other in structure but having the same chemical formula.

The xylenes are of little value commercially while there is a constantly increasing demand for toluene.

I have found that if I heat the xylenes with certain catalytically acting chemicals having, so to speak, the power of rearranging the atoms and groups in carbon compounds, under proper conditions of operation I can convert them into toluene by a simple, ready and productive method. The best chemical for my purposes is anhydrous aluminum chlorid though other materials, such as ferric chlorid, zinc chlorid, etc., may be used.

When heated with hydrocarbons aluminum chlorid exercises a breaking down and reconstructing action upon the various molecules until a certain equilibrium obtains between the hydrocarbons present. If now this equilibrium be disturbed by removing one of the products of equilibrium the reaction goes forward to reinstate the equilibrium with formation of more of the material which has just been removed. This fact is utilized in the present invention.

As a raw material for my operation I advantageously use a cheap commercial coal tar product called crude solvent naphtha and representing the neutral oils from which much or all of the benzene and toluene have been removed. As this material is ordinarily produced it contains about 70 to 80 per cent. of the three xylenes, the residue being mostly still heavier oils. While other similar distillates and products containing xylenes such as "heavy naphtha," etc., may be used, I regard this particular material as the best adapted for my present purposes.

On heating crude solvent naphtha with dry aluminum chlorid if no escape of vapors be permitted, the aluminum chlorid catalytically causes some of the xylene or dimethyl benzene to be converted into toluene, or monomethyl benzene. Zinc chlorid and ferric chlorid produce the same action but more slowly. The action however soon comes to a standstill and the amount of toluene produced is not great. If however the vapors be submitted to a partial condensation and reflux with escape of vapors at a temperature around the boiling point of toluene, 105–115° C., toluene is removed as it is formed while vaporized xylene is returned for retreatment and under these circumstances the toluene-forming reaction goes forward with formation of large amounts of toluene. In using crude solvent naphtha, some toluene seems to be formed from the other oils occurring together with the xylenes.

In a practical embodiment of the present process, I may place a quantity of the crude solvent naphtha (which should be dry and free from water) in any suitable still provided with stirring mechanism and add about 5 per cent. by weight of anhydrous aluminum chlorid. The mixture is now heated with constant stirring to a temperature at which it boils freely. The vapors are cooled to about 105–115° C., with return of liquid condensate made in so cooling. The boiling point of the mixture of aluminum chlorid and solvent naphtha while not as high as that of the solvent naphtha alone is nevertheless higher than that of toluene; and suitable cooling and reflux means must be used to insure exit of toluene vapors at 105–115° C. The vapors remaining at this temperature are sent to a condenser. The condensate will generally run about two-thirds toluene and one-sixth benzene with the remaining sixth consisting of heavy oils (xylene, etc.) carried over by the vapors. It may be fractionated in any suitable still to recover the benzene and toluene and the heavy oils. The heavy oils may be returned for retreatment. The benzene may be sold or used as such for any purpose for which it is adapted.

In a modification of my invention I return this benzene to a fresh charge of material and heat it therewith for a time prior to allowing the escape of any vapors. Under these conditions it contributes to the formation of somewhat more toluene; the yield of toluene is somewhat greater than if this expedient be not adopted.

After the distillation in the presence of aluminum chlorid has been carried to the desired extent for the production of toluene, the refluxing may be discontinued and distillation continued. Under these conditions about one-third of the original xylene will be distilled over and may be added to the next charge. The residue in the still represents a tarry mass which may be used for fuel or for any other purpose. The aluminum chlorid may be recovered from it if desired.

In a modification of my method at the time when the formation of toluene slackens, as evidenced by the slackening of the appearance of the distillate of toluene, etc., a fresh charge of oils may be added to the material in the still and distillation continued. The activity of the aluminum chlorid is not ordinarily destroyed by the treatment of one charge, although it is somewhat reduced, and this mode of operation enables considerably more toluene to be made with a single charge of aluminum chlorid. Distillation and addition of fresh portions may be continued until the aluminum chlorid completely loses its activity. Further aluminum chlorid may of course be added from time to time and instead of the addition of fresh solvent naphtha being in stages its addition to the boiling charge may be substantially continuous.

The aluminum chlorid required may be made in any suitable way as by treating metallic aluminum with hydrochloric acid or chlorin or by treatment of alumina or bauxite mixed with carbon with chlorin or hydrochloric acid.

Xylenes from any other source may be treated but I regard my invention as particularly adapted to the treatment of the stated solvent naphtha. As stated, the other oils contained in this naphtha contribute somewhat to the formation of toluene.

What I claim is:—

1. The process of making toluene which comprises reacting upon a high boiling aromatic hydrocarbon with a catalytic material, distilling off toluene, condensing the vapors formed so as to obtain benzene, adding benzene to another charge of a high boiling aromatic hydrocarbon, and reacting upon the same with a catalytic material to form toluene.

2. The process of making toluene which comprises reacting upon a high boiling aromatic hydrocarbon with a catalytic material, distilling off toluene, condensing the vapors formed so as to obtain benzene, adding benzene to another charge of a high boiling aromatic hydrocarbon, heating said charge prior to allowing the escape of vapors therefrom, and reacting upon the same with a catalytic material to form toluene.

3. The process of making toluene which comprises reacting upon xylenes with a catalytic material, distilling off toluene, condensing the vapors formed so as to obtain benzene, adding benzene to another charge of xylenes, and reacting upon the same with a catalytic material to form toluene.

4. The process of making toluene which comprises reacting upon xylenes with a catalytic material, distilling off toluene, condensing the vapors formed so as to obtain benzene, adding benzene to another charge of xylenes, heating said charge prior to allowing the escape of vapors therefrom, and reacting upon the same with a catalytic material to form toluene.

5. The process of making toluene which comprises reacting upon a high boiling aromatic hydrocarbon with a catalytic material, distilling off toluene, condensing the vapors formed so as to obtain benzene, adding benzene to another charge of a high boiling aromatic hydrocarbon, and reacting upon the same with a catalytic material to form toluene, said process being conducted by the addition of a further quantity of a high boiling aromatic hydrocarbon during the distillation of the toluene.

6. The process of making toluene which comprises reacting upon a high boiling aromatic hydrocarbon with a catalytic material, distilling off toluene, condensing the vapors formed so as to obtain benzene, adding benzene to another charge of a high boiling aromatic hydrocarbon, heating said charge prior to allowing the escape of vapors therefrom, and reacting upon the same with a catalytic material to form toluene, said process being conducted by the addition of a further quantity of a high boiling aromatic hydrocarbon during the distillation of the toluene.

7. The process of making toluene which comprises reacting upon xylenes with a catalytic material, distilling off toluene, condensing the vapors formed so as to obtain benzene, adding benzene to another charge of xylenes, and reacting upon the same with a catalytic material to form toluene, said process being conducted by the addition of a further quantity of xylenes during the distillation of the toluene.

8. The process of making toluene which comprises reacting upon xylenes with a catalytic material, distilling off toluene, condensing the vapors formed so as to obtain benzene, adding benzene to another charge of xylenes, heating said charge prior to allowing the escape of vapors therefrom, and reacting upon the same with a catalytic material to form toluene, said process being conducted by the addition of a further quantity of xylenes during the distillation of the toluene.

9. The process of making toluene which comprises reacting upon a high boiling aromatic hydrocarbon with a catalytic material, distilling off the toluene formed, and adding to the high boiling aromatic hydrocarbon additional high boiling aromatic hydrocarbon during the distilling.

10. The process of making toluene which comprises reacting upon a high boiling aromatic hydrocarbon with a catalytic material, distilling off the toluene formed, and adding to the high boiling aromatic hydrocarbon additional high boiling aromatic hydrocarbon when the formation of toluene has slackened during the distilling.

11. The process of making toluene which comprises reacting upon xylenes with a catalytic material, distilling off the toluene formed, and adding to the xylenes additional xylenes during the distilling.

12. The process of making toluene which comprises reacting upon xylenes with a catalytic material, distilling off the toluene formed, and adding to the xylenes additional xylenes when the formation of toluene has slackened during the distilling.

In testimony whereof I affix my signature.

BENJAMIN T. BROOKS.